US006968649B2

(12) United States Patent
Van Den Oord

(10) Patent No.: US 6,968,649 B2
(45) Date of Patent: Nov. 29, 2005

(54) ANISOTROPIC WEATHERSTRIP

(75) Inventor: Henricus Van Den Oord, 'S-Hertogenbosch (NL)

(73) Assignee: Laird Holdings Limited, Edinburgh (DE)

(*) Notice: Subject to any disclaimer, the term of this patent is extended or adjusted under 35 U.S.C. 154(b) by 0 days.

(21) Appl. No.: 10/169,888

(22) PCT Filed: Dec. 29, 2000

(86) PCT No.: PCT/GB00/04998

§ 371 (c)(1),
(2), (4) Date: Apr. 3, 2003

(87) PCT Pub. No.: WO01/53127

PCT Pub. Date: Jul. 26, 2001

(65) Prior Publication Data

US 2003/0150168 A1 Aug. 14, 2003

(30) Foreign Application Priority Data

Jan. 18, 2000 (GB) .................................. 0001138

(51) Int. Cl.[7] .............................................. E06B 7/22
(52) U.S. Cl. ................................. 49/498.1; 49/490.1
(58) Field of Search ........................ 49/475.1, 477.1, 49/490.1, 498.1

(56) References Cited

U.S. PATENT DOCUMENTS

| 3,952,455 | A | * | 4/1976 | McAlarney ................. 49/496.1 |
| 4,374,880 | A | * | 2/1983 | Mesnel ....................... 428/36.9 |
| 4,538,380 | A | * | 9/1985 | Colliander ................... 49/475.1 |
| 4,835,031 | A | * | 5/1989 | Schroder et al. ............. 428/122 |
| 5,072,546 | A | * | 12/1991 | Ogawa ........................ 49/490.1 |
| 5,123,693 | A | * | 6/1992 | Karashima et al. .......... 296/135 |
| 5,136,773 | A | * | 8/1992 | Mesnel et al. ............... 29/527.4 |
| 5,143,772 | A | * | 9/1992 | Iwasa .......................... 428/122 |
| 5,234,250 | A | * | 8/1993 | Hattass et al. .......... 296/216.09 |
| 5,361,542 | A | * | 11/1994 | Dettloff ....................... 49/477.1 |
| 5,437,124 | A | * | 8/1995 | Ahlfeld et al. .............. 49/479.1 |
| 5,493,814 | A | * | 2/1996 | Christian .................... 49/479.1 |

(Continued)

FOREIGN PATENT DOCUMENTS

| EP | 0102556 | 3/1984 |
| EP | 0178064 | 4/1986 |
| EP | 0385222 | 9/1990 |
| FR | 2718392 | 10/1995 |
| GB | 2305202 | 4/1997 |
| GB | 2327451 | 1/1999 |
| GB | 2355480 | 4/2001 |
| WO | WO 97/28979 | 8/1997 |

Primary Examiner—Gregory J. Strimbu
(74) Attorney, Agent, or Firm—Leydig, Voit & Mayer, Ltd

(57) ABSTRACT

A sealing arrangement comprising a channel-shaped mounting portion which includes a support member supporting a seal portion. A covering covers the seal portion and a portion of both the mounting portion and the support member. The support member includes a metal reinforcement for preventing wrinkling of the seal portion at bends of the sealing arrangement. The sealing arrangement further includes an anisotropic web made of a textile or similar material which connects the mounting portion to the support member to counteract the forces of gravity on the seal portion. The web is more stretchable in a longitudinal direction of the web than in a lateral direction of the web.

22 Claims, 1 Drawing Sheet

U.S. PATENT DOCUMENTS

| | | | |
|---|---|---|---|
| 5,511,343 A * | 4/1996 | Guillon | 49/479.1 |
| 5,606,828 A * | 3/1997 | Hall et al. | 49/490.1 |
| 5,686,165 A * | 11/1997 | Cook | 428/122 |
| 5,755,071 A * | 5/1998 | Drozd | 52/716.8 |
| 5,866,232 A * | 2/1999 | Gatzmanga | 428/122 |
| 6,247,271 B1 * | 6/2001 | Fioritto et al. | 49/490.1 |
| 6,260,254 B1 * | 7/2001 | Mueller et al. | 29/450 |
| 6,442,902 B1 * | 9/2002 | Van Den Oord | 49/498.1 |
| 6,485,663 B1 * | 11/2002 | Dover | 264/173.17 |
| 6,623,014 B1 * | 9/2003 | Martin | 277/630 |

* cited by examiner

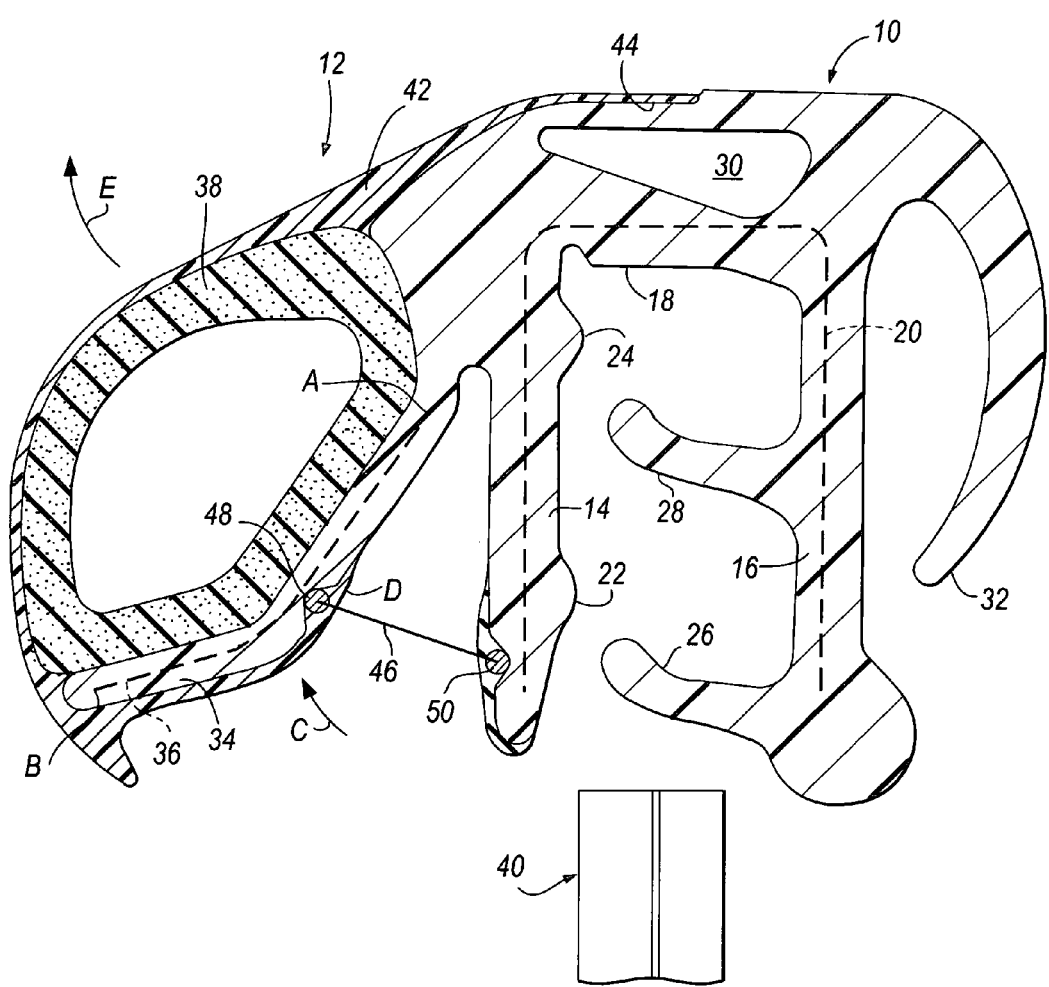

ANISOTROPIC WEATHERSTRIP

BACKGROUND OF THE INVENTION

1. Field of the Invention

The invention relates to a longitudinally extending sealing arrangement for disposal between a closure member and a closable opening comprising a surround having a length, the sealing arrangement comprising a mounting portion adapted for mounting the sealing arrangement on the surround of the closable opening, and a longitudinally extending sealing portion of hollow tubular form defining an interior volume, the sealing portion being carried by and alongside the mounting portion and being adapted to run along at least part of the length of the surround when the mounting portion is mounted on the surround and to be sealingly compressed by the closure member for the opening.

2. Description of Related Art

Such an arrangement is shown for example in U.S. Pat. No. 6,442,902 (Van den Oord) and U.S. Pat. No. 5,493,814 (Christian). The invention aims to provide an improved arrangement with the possibility of greater flexibility.

BRIEF SUMMARY OF THE INVENTION

According to the invention, therefore, the sealing portion in the sealing arrangement referred to above is carried by and alongside the mounting portion by longitudinally extending flexible support means running alongside the mounting means and attached to a linear first region of the mounting means which runs along its length in a predetermined position thereon, the flexible support means extending transversely to its length from said region and being attached to the sealing portion exteriorly to the interior volume of the sealing portion, said flexible support means being flexible to allow the sealing portion to move angularly towards and away from the mounting portion as the flexible support means flexes, and the sealing arrangement also includes a web-shaped connecting member extending along the length of the sealing arrangement, the web-shaped connecting member being attached to the mounting portion along a linear second region of the mounting means which is substantially parallel to and spaced from said first region, the web-shaped connecting member extending from said second region into attachment with the sealing portion to interconnect the sealing portion and the mounting portion, the web-shaped connecting member extending between a location on the sealing portion exteriorly of said internal volume thereof and the second region on the mounting portion, the web-shaped connecting member comprising material which is relatively stretchable in the longitudinal direction of the sealing arrangement, said material being relatively compressible widthwise but resistant to widthwise stretching, whereby the web-shaped connecting member limits the extent of angular movement of the sealing portion away from the mounting portion as the flexible support means flexes.

According to the invention, there is also provided a sealing arrangement for sealing around an opening in a motor vehicle body which is closable by a closure member, the opening having a surround, the sealing arrangement comprising a channel-shaped mounting portion made of flexible and resilient material adapted to embracingly grip the surround of the opening, the channel of the mounting portion having a base and first and second side walls, a soft resilient and flexible seal extending longitudinally along the sealing arrangement and made of flexible and resilient material, a web-shaped strip of fabric, a flexible support member extending longitudinally along the sealing arrangement and projecting from the base of the channel of the mounting portion and incliningly outward away from the outside of said first side wall of the channel, the flexible support member defining a first surface facing away from the mounting portion and a second surface facing the outside of said first side wall of the channel, the seal being mounted on said first surface and thereby supported by the flexible support member to be movable angularly towards and away from the mounting portion by flexing of the support member and so as to be sealingly compressed by the closure member, and a skin-like covering extending from the outside of the mounting portion over the outside of the seal and extending partially over the support member on said second surface thereof but being clear of that side wall, the web-shaped strip of fabric interconnecting the outside of the first channel wall at a position displaced from the base of the channel of the mounting portion and the second surface of the support member, the web-shaped strip extending along the length of the sealing arrangement and being longitudinally stretchable and readily compressible widthwise, the web-shaped strip being resistant to width-wise stretching so as to limit the extent of the angular movement of the seal away from the mounting portion as the support member flexes.

DETAILED DESCRIPTION OF THE DRAWINGS

Sealing arrangements embodying the invention will now be described, by way of example only, with reference to the accompanying diagrammatic drawing which is a diagrammatic cross-section through one of the sealing arrangements.

DETAILED DESCRIPTION OF THE INVENTION

The sealing arrangement shown in the FIGURE comprises a longitudinally extending channel-shaped mounting or gripping portion 10 which supports a similarly extending. hollow tubular sealing portion 12. The sealing arrangement is preferably produced by extrusion, but any other suitable process, such as moulding, may be used instead. The sealing arrangement is made of suitable plastics or rubber material and is preferably made from a thermoplastic elastomer. The gripping portion 10 comprises material defining opposite side walls 14,16 integral with a base 18. Preferably, a channel-shaped reinforcing core or carrier 20 is embedded in the extruded material of the side walls 14,16 and the base 18. Carrier 20 may be made of any suitable preferably resilient material, advantageously metal. It may comprise metal in the form of an unslit or slit channel, or it may comprise a series of U-shaped elements (inverted in the view shown in the FIGURE) which are arranged side by side along the length of the channel to define the channel and are either entirely disconnected from each other or integrally connected by flexible connecting links. Instead, looped wire may be used. Other forms of carrier can be used instead.

The carrier 20 is preferably incorporated in the material of the gripping portion 10 by a cross-head extruder process.

As shown in the FIGURE, channel 14 is formed with two longitudinal ridges 22,24, and the side wall 16 is formed with two longitudinal lips 26,28 which extend substantially across the width of the channel.

To increase the resilience of the gripping portion 10, and to reduce its weight, the material of the base 18 of the gripping portion may incorporate a longitudinally extending hollow chamber 30.

The material of the gripping portion is extended sideways from the base 18 to form a lip 32 which extends along the length of the sealing arrangement and is curved over towards the outside of the side wall 16. Lip 32 is a so-called "cosmetic lip" for a purpose to be described.

On the opposite side of the channel of the gripping portion 10, side wall 14 integrally carries a support member or lip 34. The support lip 34 preferably incorporates a reinforcing member 36 which extends along the length of the sealing arrangement and also extends substantially to the distal end of the lip 34.

As shown in the FIGURE, a longitudinally extending tubular seal 38 is supported on the support lip 34. The tubular seal 38 may be produced separately from the remainder of the sealing arrangement.

The tubular seal 38 may be softer and more flexible than the remainder of the extruded material, and may, for example, be spongy or of cellular construction.

In use, the gripping portion 10 is embracingly mounted on the flange which extends around the door opening on a motor vehicle body, where the inner and outer body panels are welded together. This flange is shown diagrammatically at 40 in the FIGURE. When the gripping portion 10 is forced onto the flange 40, the ends of the lips 26,28 bear against one side face of the flange, and the ridges 22,24 bear against the opposite side face thereof. In this way, and aided by the resilient of the carrier 20, the gripping portion 10 is securely mounted on the flange 40 and supports the sealing portion 12 so that it runs around the periphery of the opening, lying on the outside thereof. The closing door for the opening thus partially compresses the tubular seal 38 to form a weather-tight seal around the closed door opening. The material of the integral lips 26,28 of the gripping portion 10 may be softer than the remainder of the channel-shaped material. This increases the co-efficient of friction of the material, and helps to secure the gripping portion 10 securely on the flange.

The cosmetic lip 32 becomes positioned on the inside of the vehicle body, around the door opening, and can be used to hide the edge of a trim panel.

The use of thermoplastic elastomer material for the sealing arrangement is advantageous because of its very low weight, ease of manufacture, and recyclability. The thermoplastic elastomer material of the tubular seal 38 is preferably of soft open-cellular form. In order to protect it against ingress of moisture, it is covered with a co-extruded skin 42 which may be of closed-cellular form (but otherwise of similar material).

In order to provide good sealing, it is desirable that the material of the tubular seal 38 should be very soft and flexible. In this way, it can provide effective sealing even if there are discontinuities or variations in the thickness of the flange 40. Soft material is also advantageous because it may be of cellular form and therefore light in weight. However, it is necessary for the sealing arrangement to be bent to follow curves or corners in the door frame. When bent in this way, there will therefore be a tendency for the sealing portion 12 to become wrinkled at the curves or corners as the sealing arrangement is bent around the frame—with the mouth of the channel of the gripping portion 10 facing radially outwardly of the curve or corner. The softer is the sealing portion 12, the greater will this wrinkling tendency be. The purpose of the reinforcement 36 in the support lip 34 is to eliminate or reduce this wrinkling tendency. The reinforcement may comprise a length of looped wire of generally zig-zag configuration, or a thin metal sheet with longitudinally extending generally parallel grooves. The reinforcement 36 is designed to be relatively compressible in the "width" direction, that is relatively compressible in response to forces acting between points A and B, but relatively stiff to forces acting in the direction of the arrow C, that is, generally perpendicular to the major plane of the lip 34. The incorporation of the reinforcement 36 helps to reduce or substantially eliminate any tendency of the tubular seal 38 to wrinkle at, or bridge across, bends or curves in the mounting flange—but at the same time it does not reduce the effective softness of the sealing portion 12 in response to the closing door.

The skin 42 extends not only over the outside of the tubular seal 38 but also extends over part of the outside surface of the gripping portion 10 and lies in a recess 44. Its opposite edge extends over the underside of the support lip 34 for about half its length, to terminate along a line D. The skin 42 thus helps to hold the tubular seal 38 on the support lip 34.

It will be appreciated that the orientation of the sealing arrangement when mounted along the horizontal top run of the door frame will be inverted as compared with the orientation shown in the FIGURE. There will therefore be a tendency for the support lip 34 and the tubular seal 38 to flex outwardly in the general direction of the arrow E, in response to the effect of gravity. This is unsatisfactory because the sealing portion 12 may assume a position which is not correct for optimum sealing when the door closes onto it. In order to prevent this, therefore, a flexible web 46 extends between an anchorage point 48 on the inner face of the support lip 34 and an anchorage point 50 on the outside of the side wall 14 of the channel of the gripping portion 10, adjacent its mouth. This web may be of textile or fabric form and is anisotropic. More specifically, it is longitudinally stretchable (that is, stretchable in the direction of the sealing arrangement) but is resistant to width-wise stretching (that is, in the direction extending between the support lip 34 and the side wall 14 of the gripping portion 10). In this way, therefore, the web 46 does not impair the longitudinal flexibility of the sealing arrangement but firmly prevents outward movement of the tubular seal in the direction of the arrow E. However, the fabric of the web 46 is readily compressible in the width-wise direction, and it therefore does not impair the compressibility of the sealing arrangement in response to the closing door. More specifically, the use of a textile or fabric anisotropic web 46 is advantageous as compared with alternative arrangements in which the web 46 is omitted but, instead, the skin 42 bridges across the gap between the support lip 34 and the side wall 14 of the gripping portion 10. Such an alternative arrangement reduces the compressibility of the sealing portion 12 because of the relative stiffness of the skin 42.

What is claimed is:

1. In combination, a frame defining a closable opening and a longitudinally extending sealing arrangement for disposal between a closure member for the opening and the frame, the sealing arrangement comprising a longitudinal mounting portion mounting the sealing arrangement on the frame, a longitudinally extending hollow tubular sealing portion of flexible resilient material defining an interior volume, a longitudinally extending flexible support material extending alongside the mounting portion and attached to a linear first region of the mounting portion which extends along the length of the mounting portion, the flexible support material extending generally transversely to said region, the flexible support material being attached to the sealing portion exteriorly to the interior volume of the sealing portion so that the sealing portion is carried by and alongside the mounting portion and is adapted to run along at least part of the frame and to be sealingly compressed by the closure member for the opening as the closure member closes the opening, the flexible support material extending angularly and upwardly away from the mounting portion along at least a portion of a length of the frame, said flexible support material being flexible to allow the sealing portion to move angularly towards the mounting portion in response to the sealing compression of the sealing portion by the closure member, and a connecting member made of a fabric web and extending along the length of the sealing arrangement, the connecting member being mounted on the mounting portion along a linear second region of the mounting portion which is substantially parallel to and spaced from said first region, the connecting member extending from said second region thru a gap defined between said mounting portion and said sealing portion and mounted on the sealing portion at a location on the sealing portion exteriorly of said internal volume to interconnect the sealing portion and the mounting portion, the fabric web of the connecting member comprising an anisotropic material which is relatively stretchable in the longitudinal direction of the sealing arrangement, said anisotropic material being resistant to widthwise stretching in a direction generally transverse to the longitudinal direction of the sealing arrangement, whereby the fabric web limits an extent of angular movement of the sealing portion away from the mounting portion in response to gravitational forces acting on said sealing portion along said part of the frame, to hold the sealing portion in a desired attitude prior to its compression by the closure member.

2. The combination according to claim 1, wherein the flexible support material is flexibly supported by the mounting portion, the sealing portion being attached to the flexible support material so as to be presented thereby to the closure member, said connecting member extending between the flexible support material and the mounting portion.

3. The combination according to claim 2, wherein the mounting portion is channel-shaped for embracingly gripping the frame, the connecting member extending from an outside of one channel side wall of the mounting portion.

4. The combination according to claim 2, wherein the flexible support material comprises a resilient material which is embedded a reinforcement.

5. The combination according to claim 2, where in the sealing portion has an outer covering, the covering extending over the sealing portion and partially over the flexible support material, for at least partially securing hte sealing protion to the flexible support material.

6. The combination according to claim 1, wherein the mounting portion is channel-shaped for embracingly gripping the frame.

7. The combination according to claim 1, wherein the mounting portion comprises a flexible resilient material.

8. The combination according to claim 7, wherein the flexible resilient material is a plastics material.

9. The combination according to claim 7, wherein the flexible resilient material is a rubber material.

10. The combination according to claim 1, further comprising a reinforcing resilient carrier embedded in the mounting portion.

11. The combination according to claim 1, wherein at least the sealing portion substantially comprises a thermoplastic elastomer material.

12. The combination according to claim 11, wherein the sealing portion has an outer covering.

13. The combination according to claim 12, wherein the sealing portion comprises a flexible open-cellular thermoplastic elastomer material and the covering comprises a closed-cellular material.

14. In combination, a frame defining a closable opening in a motor vehicle body and a sealing arrangement for sealing around the opening, said opening being closable by a closure member, said frame having a part extending non-vertically with respect to the motor vehicle body, the sealing arrangement comprising a mounting portion made of a flexible and resilient material embracingly gripping the frame and defining a channel, the channel of the mounting portion having a base and first and second side walls defining a mouth of the channel, the mouth of the channel facing away from the opening defined by the frame, a resilient and flexible seal extending longitudinally along the sealing arrangement and made of a resilient material, an anisotropic fabric web strip, a flexible support member extending longitudinally along the sealing arrangement and projecting from the base of the channel of the mounting portion and inclining outwardly away from an outside of said first side wall of the channel, the flexible support member defining a first surface facing away from the mounting portion and a second surface facing the outside of said first side wall of the channel, the seal being mounted on said first surface and thereby supported by the flexible support member to be movable angularly towards and away from the mounting portion by flexing of the support member and so as to be sealingly compressed towards the mounting portion by the closure member as the closure member closes the opening, and a covering extending from an outside of the mounting portion over an outside of the seal and extending partially over the support member on said second surface thereof but being clear of said first side wall, the web strip interconnecting the outside of the first side wall at a position displaced from the base of the channel of the mounting portion with the second surface of the support member, the strip extending along the length of the sealing arrangement and being longitudinally stretchable, the strip being more resistant to width-wise stretching, in a direction perpendicular to its length than to stretching in said direction parallel to its length so as to limit an extent of the angular movement of the seal away from the mounting portion as the support member flexes in response to gravitational forces acting on said seal along said part of the frame to hold the seal in a desired attitude prior to its sealing compression by the closure member, the strip being readily compressible in the direction perpendicular to its length so as to provide substantially no resistance to movement of the seal towards the mounting portion in response to the sealing compression of the seal by the closure member.

15. The combination according to claim 14, wherein the seal is of hollow tubular form.

16. The combination according to claim 15, wherein the resilient material of the seal comprises an open-cellular thermoplastic elastomer material and the covering comprises a closed-cellular material.

17. The combination according to claim 14, wherein the material of the mounting portion has embedded within it a resilient channel-shape reinforcing carrier.

18. The combination according to claim 14, wherein an inner face of at least one of the side walls of the channel includes an integral lip extending into the channel and along the length of the sealing arrangement for frictionally contacting the frame.

19. The combination according to claim 14, wherein the support member incorporates a reinforcing material which is compressible in a longitudinal direction of the support member than in a lateral direction of the support member.

20. The combination according to claim 14, wherein the mounting portion is made of a plastics material.

21. The combination according to claim 14, wherein the mounting portion is made of a rubber material.

22. The combination according to claim 14, wherein the mounting portion is made of a thermoplastic elastomer material.

* * * * *